United States Patent
Johansson et al.

(10) Patent No.: US 9,854,496 B2
(45) Date of Patent: Dec. 26, 2017

(54) METHOD OF HIGH-EFFICIENCY CONNECTED MODE CELL RE-SELECTION

(71) Applicant: MEDIATEK INC., Hsinchu (TW)

(72) Inventors: Per Johan Mikael Johansson, Kungsangen (SE); Li-Chuan Tseng, Taipei (TW); Chia-Chun Hsu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/240,083

(22) Filed: Aug. 18, 2016

(65) Prior Publication Data

US 2017/0055192 A1 Feb. 23, 2017

Related U.S. Application Data

(60) Provisional application No. 62/207,466, filed on Aug. 20, 2015.

(51) Int. Cl.
*H04W 36/00* (2009.01)
*H04W 36/30* (2009.01)
(Continued)

(52) U.S. Cl.
CPC ............ *H04W 36/30* (2013.01); *H04W 36/36* (2013.01); *H04W 36/38* (2013.01); *H04W 76/048* (2013.01)

(58) Field of Classification Search
CPC . H04W 76/048; H04W 76/046; H04W 72/04; H04W 36/00; H04W 76/028; H04W 76/02; H04W 76/025; H04W 76/06; H04W 36/08; H04W 48/12; H04W 36/0016; H04L 5/0035; H04L 1/0031; H04L 5/001; H04L 65/10
(Continued)

(56) References Cited

U.S. PATENT DOCUMENTS

2014/0044029 A1 2/2014 Chou et al.
2015/0009815 A1 1/2015 Hsu et al.
(Continued)

FOREIGN PATENT DOCUMENTS

CN 102257863 A 11/2011

OTHER PUBLICATIONS

International Search Report and Written Opinion dated Nov. 30, 2016 in PCT/CN2016/095972.

*Primary Examiner* — Kwasi Karikari
(74) *Attorney, Agent, or Firm* — Oblon, McClelland, Maier & Neustadt, L.L.P.

(57) ABSTRACT

A novel and efficient connected mode cell reselection procedure is proposed to improve the mobility performance for user equipments (UEs) configured with extended connected mode Discontinuous Reception (DRX) cycle in LTE systems. A UE-centric mobility mechanism with which a UE performs cell reselection in RRC connected mode is proposed. The UE is allowed to select a target cell without handover signaling in the source cell and when needed to initiate signaling with the target cell, for which signal quality is much better. In this way, handover failures due to failed signaling in the source cell can be avoided. More specifically, the proposed mobility mechanism reduces signaling overhead and is inherently robust towards different DRX cycle settings, i.e., longer DRX cycles do not cause more failures, or more overhead, or more battery consumption.

20 Claims, 6 Drawing Sheets

(51) Int. Cl.
  *H04W 76/04* (2009.01)
  *H04W 36/38* (2009.01)
  *H04W 36/36* (2009.01)

(58) Field of Classification Search
  USPC .......................................................... 455/437
  See application file for complete search history.

(56) References Cited

U.S. PATENT DOCUMENTS

2015/0223126 A1* 8/2015 Jung .................... H04W 36/04
                                                   455/444
2015/0304853 A1* 10/2015 Murray ............... H04W 76/068
                                                   455/454
2016/0007252 A1* 1/2016 Larmo .............. H04W 36/0088
                                                   370/332

* cited by examiner

METHOD OF HIGH-EFFICIENCY CONNECTED MODE CELL RE-SELECTION

CROSS REFERENCE TO RELATED APPLICATION

This application claims priority under 35 U.S.C. §119 from U.S. Provisional Application No. 62/207,466, entitled "A Method of High-efficiency Connected Mode Cell Reselection," filed on Aug. 20, 2015, the subject matter of which is incorporated herein by reference.

TECHNICAL FIELD

The disclosed embodiments relate generally to wireless communication systems, and, more particularly, to connected mode cell reselection procedure for user equipments (UEs) configured with extended Discontinuous Reception (DRX) cycle in LTE systems.

BACKGROUND

Long-Term Evolution (LTE) systems offer high peak data rates, low latency, improved system capacity, and low operating cost resulting from simple network architecture. An LTE system also provides seamless integration to older wireless network, such as GSM, CDMA and Universal Mobile Telecommunication System (UMTS). Enhancements to LTE systems are considered so that they can meet or exceed IMA-Advanced fourth generation (4G) standard. One of the key enhancements is to support bandwidth up to 100 MHz and be backwards compatible with the existing wireless network system. In LTE/LTE-A systems, an evolved universal terrestrial radio access network (E-UTRAN) includes a plurality of evolved Node-Bs (eNBs) communicating with a plurality of mobile stations, referred as user equipments (UEs).

Typically, each UE needs to periodically measure the received signal quality of the serving cell and neighbor cells and reports the measurement result to its serving eNB for potential handover or cell reselection. The measurements may drain the UE battery power. In order to keep UE battery consumption low, the UE needs to toggle between sleeping and awake states. Preferably it should be possible for UEs in connected mode to apply similar sleep/awake performance as in Idle mode, to have similar battery consumption as in Idle mode. To save power, Discontinuous Reception (DRX) needs to be used in Connected mode, with short awake times and long sleep cycles. With DRX extension, UEs are configured with longer Connected mode DRX cycle.

Despite the benefit of power saving, one major drawback of DRX extension is the handover performance degradation. The performance of the current network-controlled handover procedure, which is based on signaling in both source cell and target cell, is dependent on triggering the handover procedure at the best moment in time, which in turn depends on factors such as UE speed, radio deployment, and DRX cycle. When DRX is applied, radio resource management (RRM) measurement is performed only within DRX ON durations, and longer DRX cycle leads to sparser measurement. In the most common failure case, the handover trigger is too late, and the radio link quality degrades below minimum requirement for successful transmission before handover complete, resulting in handover failure (HoF) or radio link failure (RLF). In essence, the UE has already moved outside sufficient radio coverage of its serving cell when the UE wakes up to perform a measurement and delivers a measurement report to the eNB of the serving cell, leading to failure either in the sending/receiving the measurement report from the UE to the eNB, or in the sending/receiving of subsequent reconfiguration or handover command message from the eNB. Thus, a high connection failure rate would be a normal case for a UE applying extended DRX cycle.

When a connection failure happens, in current LTE systems, several signaling messages are required to recover the radio connection. First, a signaling radio bearer (SRB), then in subsequent step additional SRBs and data radio bearers (DRB), are needed to transport application user data, and to restart DRX operation allowing the UE to go to sleep. Therefore, the increase of connection failures due to DRX extension in the current system reduces the usefulness of long DRX cycle, and puts limits to the battery autonomy.

A solution is sought to improve the mobility performance for UEs configured with extended connected mode DRX cycle in LTE systems.

SUMMARY

A novel and efficient connected mode cell reselection procedure is proposed to improve the mobility performance for user equipments (UEs) configured with extended connected mode Discontinuous Reception (DRX) cycle in LTE systems. A UE-centric mobility mechanism with which a UE performs cell reselection in RRC connected mode is proposed. The UE is allowed to select a target cell without handover signaling in the source cell and when needed to initiate signaling with the target cell, for which signal quality is much better. In this way, handover failures due to failed signaling in the source cell can be avoided. More specifically, the proposed mobility mechanism reduces signaling overhead and is inherently robust towards different DRX cycle settings, i.e., longer DRX cycles do not cause more failures, or more overhead, or more battery consumption.

In one embodiment, a UE receives a cell reselection configuration in a wireless communication system. The UE is in RRC connected mode applying an extended DRX cycle in a serving cell. The UE determines whether to perform a connected mode cell reselection mechanism or a network-controlled handover mechanism. The UE performs the connected mode cell reselection mechanism if a first condition is satisfied and selecting a target cell based on the cell reselection configuration. The UE determines whether to initiate an RRC reestablishment procedure upon selecting the target cell. The UE performs the RRC reestablishment procedure towards the selected target cell if a second condition is satisfied.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In long term evolution (LTE/LTE-A) systems, an evolved universal terrestrial radio access network (E-UTRAN) includes a plurality of evolved Node-Bs (eNBs) communicating with a plurality of mobile stations, referred as user equipments (UEs). Typically, each UE needs to periodically measure the received signal quality of the serving cell and neighbor cells and reports the measurement result to its serving eNB for potential handover or cell reselection. The measurements may drain the UE battery power. In order to keep UE battery consumption low, UE needs to toggle between sleeping and awake states. Preferably it should be possible for UEs in Connected mode to apply similar sleep/awake performance as in Idle mode, to have similar battery consumption as in Idle mode. To save power, Discontinuous Reception (DRX) needs to be used in Connected mode, with short awake times and long sleep cycles. With DRX extension, UEs are configured with longer Connected mode DRX cycle.

Current 3GPP LTE/LTE-A systems adopt a network-controlled, UE-assisted handover procedure for mobility management, which requires signaling in both the source cell (that serves the UE before the handover) and in the target cell (that is intended to serve the UE after successful handover). For moving UEs configured with longer DRX cycle, however, mobility performance degradation is observed, causing signaling overhead and reduced battery life due to recoveries of lost connection. This is particularly problematic for UEs with regular but sparse traffic, e.g. UEs with M2M traffic or background keep-alive traffic, e.g. for presence applications, as such traffic could render it efficient to keep UEs in connected mode for very long times to avoid the overhead of transition between Idle and connected modes. For such situations, it would be battery efficient for the UE to use DRX with significant longer sleep times. However, for systems using network-controlled handover as the mechanism for mobility, the efficiency of this strategy is reduced by expected high failure rates as the signaling in the source cell is more likely to fail the longer the DRX cycle. One important reason of the poor mobility performance when applying extended DRX cycle is that the UE fails to deliver a measurement report to the source eNB or fails to receive handover command from the source eNB.

Figure 1:
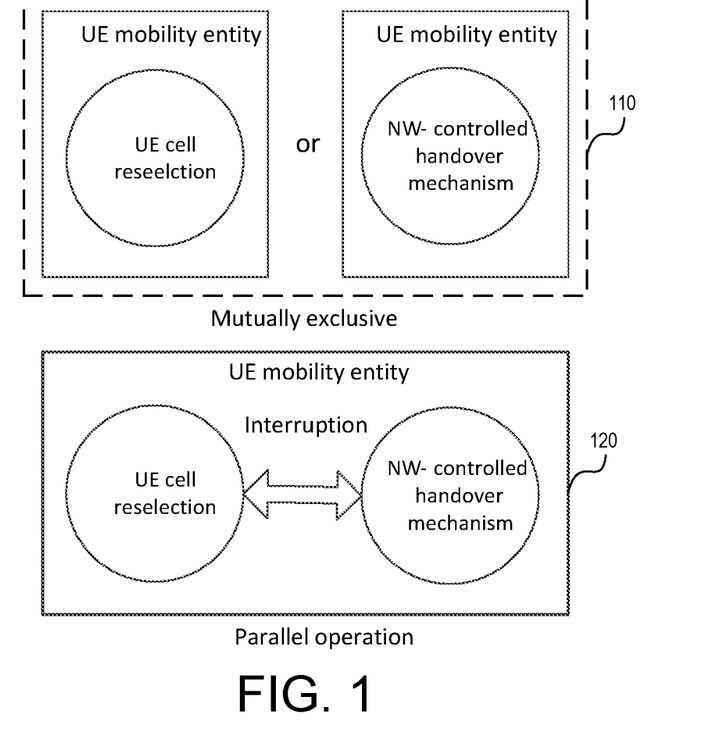
FIG. 1 illustrates two different mechanisms of mobility management of a user equipment (UE) applying discontinuous reception (DRX) configuration in an LTE network in accordance with one novel aspect.

FIG. 1 illustrates two different mechanisms of mobility management of a UE applying extended DRX configuration in an LTE network in accordance with one novel aspect. The mobility entity of a UE can contain both network-controlled and UE-centric handover mechanisms. Moreover, the two mechanisms can be either mutually exclusive as depicted by 110 or operated in parallel as depicted by 120. In one novel aspect, a UE-centric mechanism with which a UE performs cell reselection in connected mode is proposed. The UE is allowed to select a target cell without handover signaling in the source cell and when needed initiate signaling with the target cell, for which signal quality is much better. In this way, handover failures due to failed signaling in the source cell can be avoided. More specifically, the proposed mechanism reduces signaling overhead and is inherently robust towards different DRX cycle settings, i.e., longer DRX cycles do not cause more failures, or more overhead, or more battery consumption.

The language that is used herein is mostly defined in the referenced 3GPP technical specifications. 3GPP Technical Specification (TS) 36.331 describes current LTE handover procedures, including measurement event reporting and message exchanges related to handover. DRX operations in connected mode can be found in TS 36.321. UE procedures in Idle mode is described in TS 36.304. UMTS procedures are described in TS 25.331 and TS 25.304. The notation "RRC reestablishment" or just "reestablishment" is here intended to include embodiments where the existing RRC connection reestablishment procedure of LTE is reused and enhanced to perform functions included here, as well as embodiments where a new procedure (with another name) is used. The main function of such procedure as outlined here is twofold, a) to indicate to the network that the UE is in a new location and that the UE can, and wants to, use the indicated cell, and b) (re-)establish security and connectivity, radio bearers, for the new cell. Embodiments where these functions are split in separate procedures are intended to be covered herein, e.g. "Cell update". Also embodiments where the UE maintains connection with another cell are included, where the signaling messages could indicate request to add a cell, a secondary cell, or a secondary cell group.

The notation "cell reselection" or "UE cell reselection" is used here in a wide sense, including both the narrower definition in 3GPP, i.e. a process in the UE to measure, rank, select and camp on a cell, but in connected mode, as well as the procedures needed to maintain security associations, connection and inform the network about UE location, that the UE suggest to use a particular cell etc. The notation "network based handover" is used here to denote an existing mobility procedure for connected mode, where signaling is performed both in source and target cells. The notation "connected mode" is used here in a wide sense, including embodiments that include state where the UE and the network keeps context information to quickly be able to transmit and receive data, without context establishment signaling, i.e. including existing definition of connected mode, enhanced connected mode with enhancements relating to the usage of DRX and extended DRX, enhanced Idle mode with enhancements where additional context information is stored in the UE and eNB, e.g. Access Stratum security configuration, bearer configuration, header compression context (which are never stored in Idle mode normally). The wording later used "the UE uses a DRX cycle" is primarily intended to cover the dynamic behavior of DRX adapting to traffic activity, i.e. when using multiple levels of DRX, e.g. short DRX+long DRX+extended DRX, typically each of these three levels involves a certain typical sleep time/DRX cycle time, and typically the UE would switch between these levels either by traffic/timer-expiry functionality, or by explicit commands from the network.

In accordance with one novel aspect, the UE-centric connected mode cell reselection in FIG. 1 includes the following enabling elements: 1) reception of configuration information, sent with minimum overhead; 2) usage of RRC measurement events, such as the same as or similar to A3, A4, A5, B2 to trigger cell reselection rather than measurement report, for more exact control of the cell border and to ensure consistent UE behavior when there is toggling between network controlled handover and UE cell reselection; 3) the procedure for connected mode UE cell reselection and the reuse of existing LTE procedures; 4) the rules necessary to be implemented in order to allow operation of both network based handover and UE cell reselection, in order to avoid the complex state management; 5) introduction of a lightweight area concept to reduce the needed UE signaling, i.e., avoid UE signaling altogether at some cell changes; and 6) handling for failed cell reselection, i.e., when reestablishment to a selected cell is rejected, e.g. typically due to overload or load-balancing.

Figure 2:
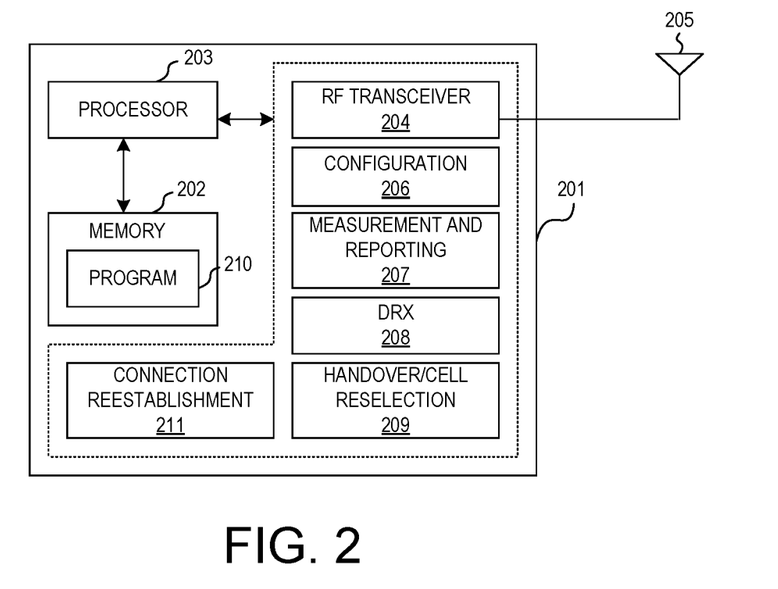
FIG. 2 is a simplified block diagram of a UE for mobility management with connected mode cell reselection in accordance with one novel aspect.

FIG. 2 is a simplified block diagram of a UE 201 for mobility management with connected mode cell reselection in accordance with one novel aspect. UE 201 has memory 202, a processor 203, and radio frequency (RF) transceiver module 206. RF transceiver 204 is coupled with antenna 205, receives RF signals from antenna 207, converts them to baseband signals, and sends them to processor 203. RF transceiver 204 also converts received baseband signals from the processor 203, converts them to RF signals, and sends out to antenna 205. Processor 203 processes the received baseband signals and invokes different functional modules to perform features in UE 201. Memory 202 stores data and program instructions 210 to be executed by the processor to control the operations of UE 201. Suitable processors include, by way of example, a special purpose processor, a digital signal processor (DSP), a plurality of microprocessors, one or more microprocessors associated with a DSP core, a controller, a microcontroller, Application specific integrated circuits (ASICs), Field programmable gate array (FPGAs) circuits, and other type of integrated circuit (IC), and/or state machine. A processor in associated with software may be used to implement and configure features of UE 201.

UE 201 also includes multiple function modules and circuits that carry out different tasks in accordance with embodiments of the current invention. The function modules and circuits may be implemented and configured by hardware, firmware, software, and combinations of the above. Configuration module 206 receives configuration information from the network for measurement, cell reselection in Idle mode, and cell reselection in connected mode. UE 201 then determines whether to apply connected mode cell reselection and which parameters are used for connected mode cell reselection. Measurement and reporting module 207 performs various L1/L2 RRM measurements and L3 filtering for reference signal received power and/or reference signal received quality (RSRP/RSRQ) over serving and neighboring cells, and then determines whether any measurement event is triggered for measurement reporting. Discontinuous Reception (DRX) module 208 configures UE 201 for normal DRX operation and extended DRX operation with corresponding DRX parameters received from the network. Handover and cell reselection handler 209 performs handover and cell reselection based on the configured triggering conditions and parameters. Connection reestablishment handler 211 performs signaling and radio bearer establishment for RRC connection reestablishment with the target base station upon cell reselection.

Figure 3:
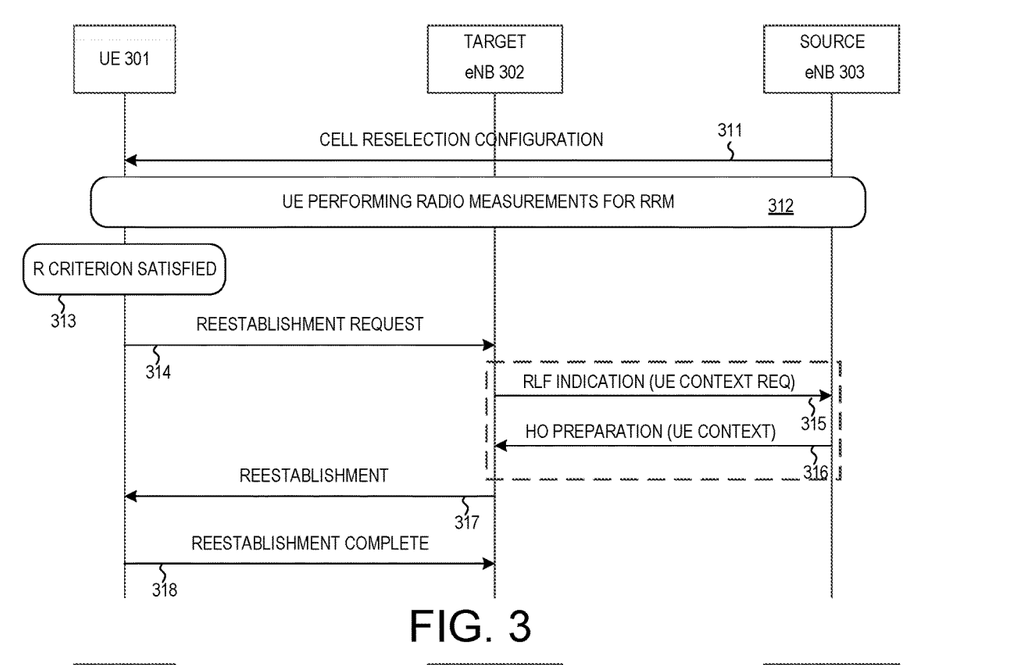
FIG. 3 illustrates a message flow between a UE and a network for successful UE controlled cell change in accordance with one novel aspect.

FIG. 3 illustrates a message flow between a UE and a network for successful UE controlled cell change in accordance with one novel aspect. In step 311, UE 301 receives configuration from its serving eNB 303. The configuration contains cell reselection criterion and other corresponding parameters such as reselection timer, a white list of neighboring eNBs supporting connected mode cell reselection, frequency/RAT priority list, cell/frequency specific offset, etc. In step 312, UE 301 performs RRM measurements for serving and neighboring cells during periodic wakeups. In step 313, UE 301 finds that a neighbor cell meets specific triggering conditions (i.e., R criterion based on radio measurements), and the cell also meets other suitability criteria. UE 301 then reselects to this cell and starts to camp there, i.e., UE 301 receives system information and is reachable by monitoring a downlink channel where UE 301 can receive dedicated information. Upon camping on a new cell, or upon camping on a cell of a new area, in step 314, UE 301 sends a reestablishment request or similar to the target eNB 302. Note that the triggering condition can be the same as for conventional handover (e.g., R criterion can be set to match event A3 with TTT timer) or the same criterion as for Idle mode cell reselection, but with specific parameters for connected mode, e.g., a different offset can be used. Target eNB 302 receives the reestablishment request and inspects whether it possesses the UE context (e.g., if it is prepared). If eNB 302 is not prepared, then in steps 315 and 316, eNB 302 starts UE context fetch in the backhaul, e.g., the UE context fetch procedure introduced during HetNet mobility can be reused here. If an SCELL context is needed, this could also be requested by network signaling. In step 317, eNB 302 sends a reestablishment to UE 301. Finally, in step 318, UE 301 receives the reestablishment message and sends a reestablishment complete message to target eNB 302.

The measurements in step 312 may be performed in several ways. If network controlled handover procedure is operated, recurring measurements required for the measurement configuration are performed. If only cell reselection is operated, Idle-mode-like measurement behavior may be adopted. That is, measurement on neighbor cells is performed only when the serving cell signal strength is below some threshold. The reasons are twofold. First, UE cell reselection is suitable for connected UE with extended DRX cycle, which tend to be stationary devices (e.g. M2M), and thus UE does not need to measure neighboring cells every time the UE wakes up. Second, even for non-stationary UEs, since the UE will not need to perform signaling with source eNB, slightly delayed measurement is no big problem. In this way, power consumption can be reduced.

For connected mode cell reselection measurements, similar thresholds as in Idle mode cell reselection measurements are needed on signal strength and quality. The thresholds may be defined based on mechanisms similar to that in Idle mode. For example, to guarantee seamless handover toward the best cell, the UE should perform measurements earlier in connected-mode cell reselection than in Idle mode. Thus the SrxlevServing threshold should be set higher in connected mode. This can be done by adding a connected-mode offset to the Idle mode threshold. For example, let offset,conn be the connected-mode offset, the threshold is given by sIntraSearch,conn=sIntraSearch+offset,conn, and the intra-frequency measurement is triggered when serving cell signal strength falls below the threshold, i.e. SrxlevServing<sIntraSearch,conn.

The connected mode cell reselection in step 313 can have two paths. The first path is for Intra-frequency and equal priority Inter-Frequency Cell Reselection Criteria. For cell reselection concerning cells with the same priority, a target cell can be reselected is it is offset better than the serving cell. Similar R-criteria for cell ranking can be adopted with specific offset value for connected mode. For example, the A3 offset for network-based handover can be considered. The second path is for E-UTRAN Inter-Frequency and Inter-RAT Cell Reselection Criteria. For cell reselection concerning cells with different priorities, a higher-priority neighbor cell can be reselected when its RX or quality level is above a threshold $Thresh_{High}$. On the other hand, a lower-priority neighbor cell can be reselected when its RX or quality level is above a threshold $Thresh_{Low}$ and the serving cell falls below another threshold. In connected mode, thresholds different from that in Idle mode can be configured.

With connected mode cell reselection, a cell update procedure is performed in the target cell. The first step is to choose the target cell. In Idle mode cell reselection, a UE chooses the cell to camp on according to cell ranking. In connected mode, however, the target cell is determined by RRM measurement events, e.g. measurement events described in 3GPP TS 36.331 v12.0.0, configured in the UE by measurement configuration, and where the triggering of a measurement event leads to UE sending a measurement report to the network. Enhanced version of current measurement events may be introduced, where the UE instead of sending a measurement report triggers cell reselection to the cell for which the event is triggered. Moreover, an optimized re-establishment procedure can be considered, which includes reusing the old UE configuration, and/or pre-specified configurations. The benefit of an optimized re-establishment procedure would be that a subsequent reconfiguration procedure can be avoided, at least in non-complex cases where small amounts of data is transmitted. The current re-establishment procedure should thus be updated to also recover at least one Data radio bearer, and additional signaling radio bearer as necessary. A modified RRCConnectionReestablishmentRequest can be used for reselection for UE, where previous RRC configuration can be recycled (e.g. kept at eNB or signaled back from UE) to reduce signaling.

Figure 4:
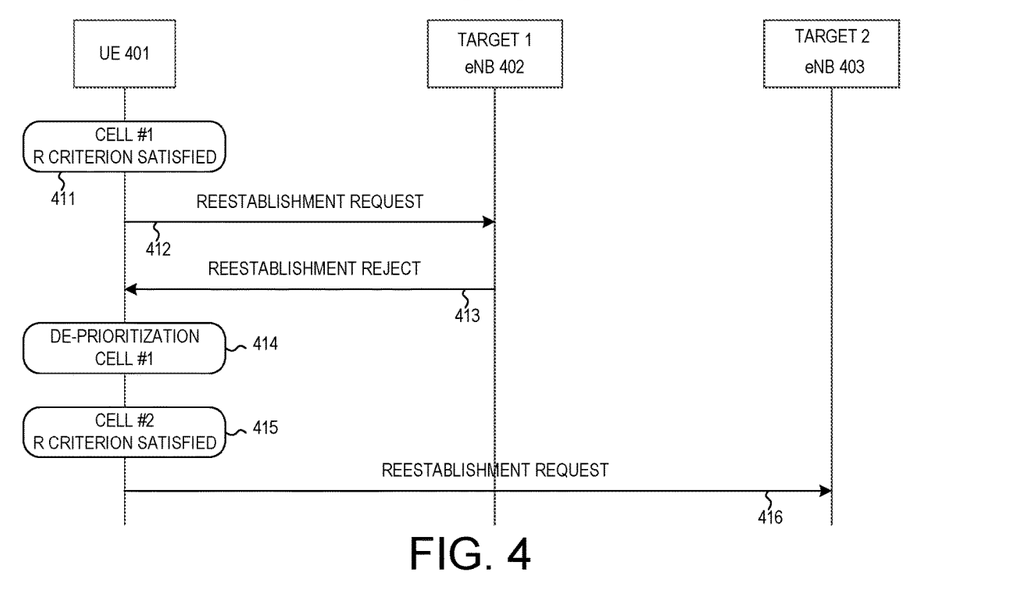
FIG. 4 illustrates a message flow between a UE and a network for rejected UE controlled cell change in accordance with one novel aspect.

FIG. 4 illustrates a message flow between a UE and a network for rejected UE controlled cell change in accordance with one novel aspect. In step 411, UE 401 performs cell reselection and cell #1 of target eNB 402 satisfies the R criteria. In step 412, UE 401 sends a reestablishment request to target eNB 402. The request comprises a source PCI, source C-RNTI, and short MAC-I. In step 413, UE 401 receives a reestablishment reject message from eNB 402, e.g., due to overload or load balancing. The reject message comprises de-prioritization information. When receiving the reestablishment reject, the UE would deprioritize the cell where the reject was received in step 414. One way to do the de-prioritization is to apply a radio measurement offset to the cell in the ranking process, for equal priority or intra-frequency cell reselection. Another way could be to lower the priority of the frequency of the cell or the cell itself, in priority based cell reselection. In the reject message, the eNB could supply information for the UE to use, e.g. a radio measurements offset, e.g. a priority or delta change to the priority to apply to the frequency, or the cell. One possibility is that the UE could receive a more comprehensive set of parameters for cell reselection. The de-prioritization information is a dedicated mobility configuration. The de-prioritization should be valid for a certain time only. After the time has passed the UE would remove the particular de-prioritization configuration. The eNB could also supply the start value for this timer. The de-prioritization is likely to result in that the reselected cell no longer meets the R criterion, and the reestablishment procedure is aborted.

In step 415, another cell #2 of target eNB 403 may then fulfill the reselection criterion and UE 401 may initiate a reestablishment towards this cell #2. In step 416, UE 401 sends a reestablishment request to target eNB 403. The request comprises a source PCI, source C-RNTI, and short MAC-I. In case a deprioritized cell becomes the best cell while the UE still applies de-prioritization for this cell or this frequency, then this need to be indicated to the eNB. The eNB may then either accept the UE or reject again. If the UE is rejected in cell for which the UE is applying de-prioritization, the UE should go to Idle, apply cell selection while treating the reestablishment reject cell or the frequency of this cell as barred, as this would be a very simple way to trigger the UE to explore more options for camping.

To support clear logic, in the reestablishment reject message from the network to the UE, the network could indicate if the UE should do de-prioritization or just follow legacy behaviors. Furthermore, the network could provide more detailed de-prioritization information that the UE shall apply in continued cell reselection, and may provide one or more of the following: 1) an additional offset value to apply to this cell or this frequency layer in cell reselection evaluation; 2) an indication that UE shall treat this cell or this frequency layer as barred; and 3) a time duration for which the de-prioritization information is valid.

Figure 5A:
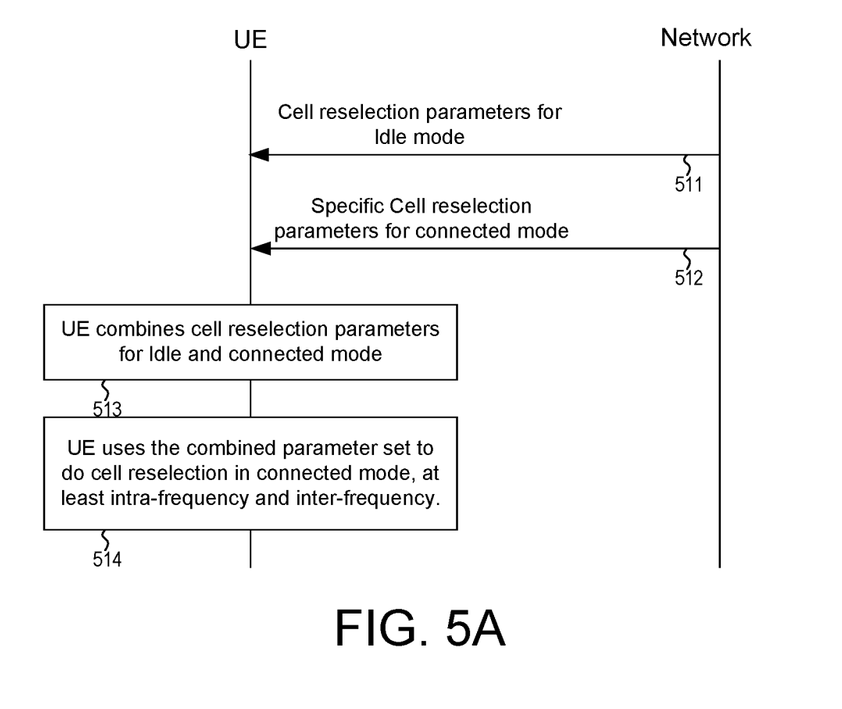
FIG. 5A illustrates a first embodiment of UE receiving and processing configuration information from the network for connected mode cell reselection.

FIG. 5A illustrates a first embodiment of UE receiving and processing configuration information from the network for connected mode cell reselection. In step 511, a UE receives cell reselection parameters for Idle mode. In step 512, the UE receives specific cell reselection parameters for connected mode. In step 513, the UE combines cell reselection parameters for Idle and connected mode. In step 514, the UE uses the combined parameter set to do cell reselection in connected mode, at least intra-frequency and inter-frequency. The nature of the configuration parameters depends on the nature of the connected mode cell reselection. One straightforward way is that the cell reselection in connected mode works in the same way as cell reselection in Idle mode, and then some parameters can be shared between Idle and connected mode. A preferred way to share such parameters is that the UE applies the Idle mode parameters, except for the parameters for which the UE has received a specific parameter instance for connected mode. Another possibly is that the UE could receive a delta-parameter e.g. another offset of set of offsets to apply in addition to Idle mode parameters for connected mode cell reselection.

Figure 5B:
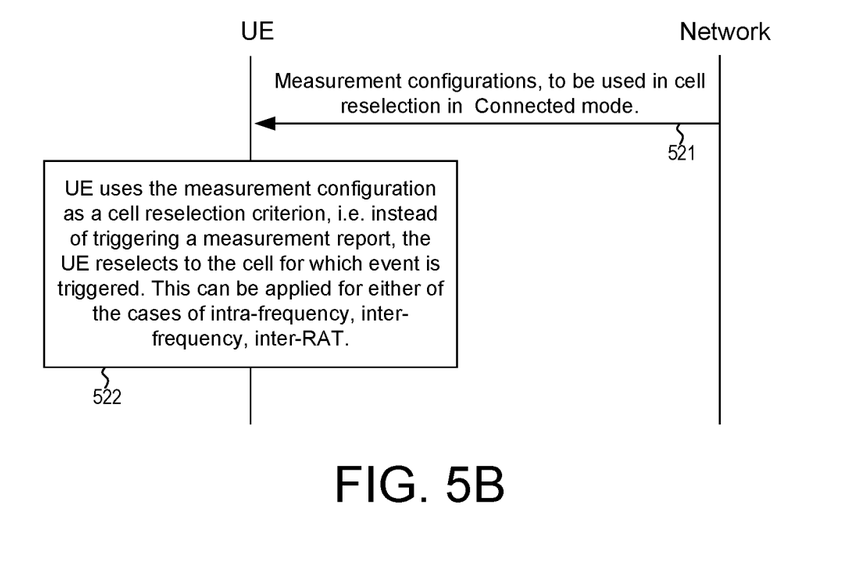
FIG. 5B illustrates a second embodiment of UE receiving and processing configuration information from the network for connected mode cell reselection.

FIG. 5B illustrates a second embodiment of UE receiving and processing configuration information from the network for connected mode cell reselection. In step 521, a UE receives measurement configurations to be used in cell reselection in connected mode. In step 522, the UE uses the measurement configurations as a cell reselection criterion, i.e., instead of triggering a measurement report, the UE reselects to the cell for which event is triggered. This can be applied for either of the cases of intra-frequency, inter-frequency, inter-RAT. It is possible to run cell reselection evaluation in the way of connected mode measurement evaluation, i.e. to reuse RRC measurement events that are normally used to trigger measurement reports.

In LTE systems, measurement events A1, A2, A3, A4, and A5 are based upon either RSRP or RSRQ measurements of the serving cell as compared to neighboring cells. The LTE event A1 is triggered when the serving cell becomes better than a threshold. The LTE event A2 is triggered when the serving cell becomes worse than a threshold. The LTE event A3 is triggered when a neighboring cell becomes better than the serving cell by an offset. The LTE event A4 is triggered when a neighboring cell becomes better than a threshold. The LTE event A5 is triggered when the serving cell becomes worse than a first threshold while a neighboring cell becomes better than a second threshold. When applied for connected mode cell reselection, instead of triggering a measurement report, cell reselection is triggered towards the cell for which the measurement event is triggered. In such case, the UE could preferably receive a connected mode cell reselection configuration that may overlap with connected mode measurement configuration, e.g. the same measurement objects could be used, the same neighbor cell lists, and same cell specific offsets could be used. The event specific configuration, the "reporting" configuration would however reasonably be separate between connected mode measurement reporting and connected mode cell reselection.

Figure 6:
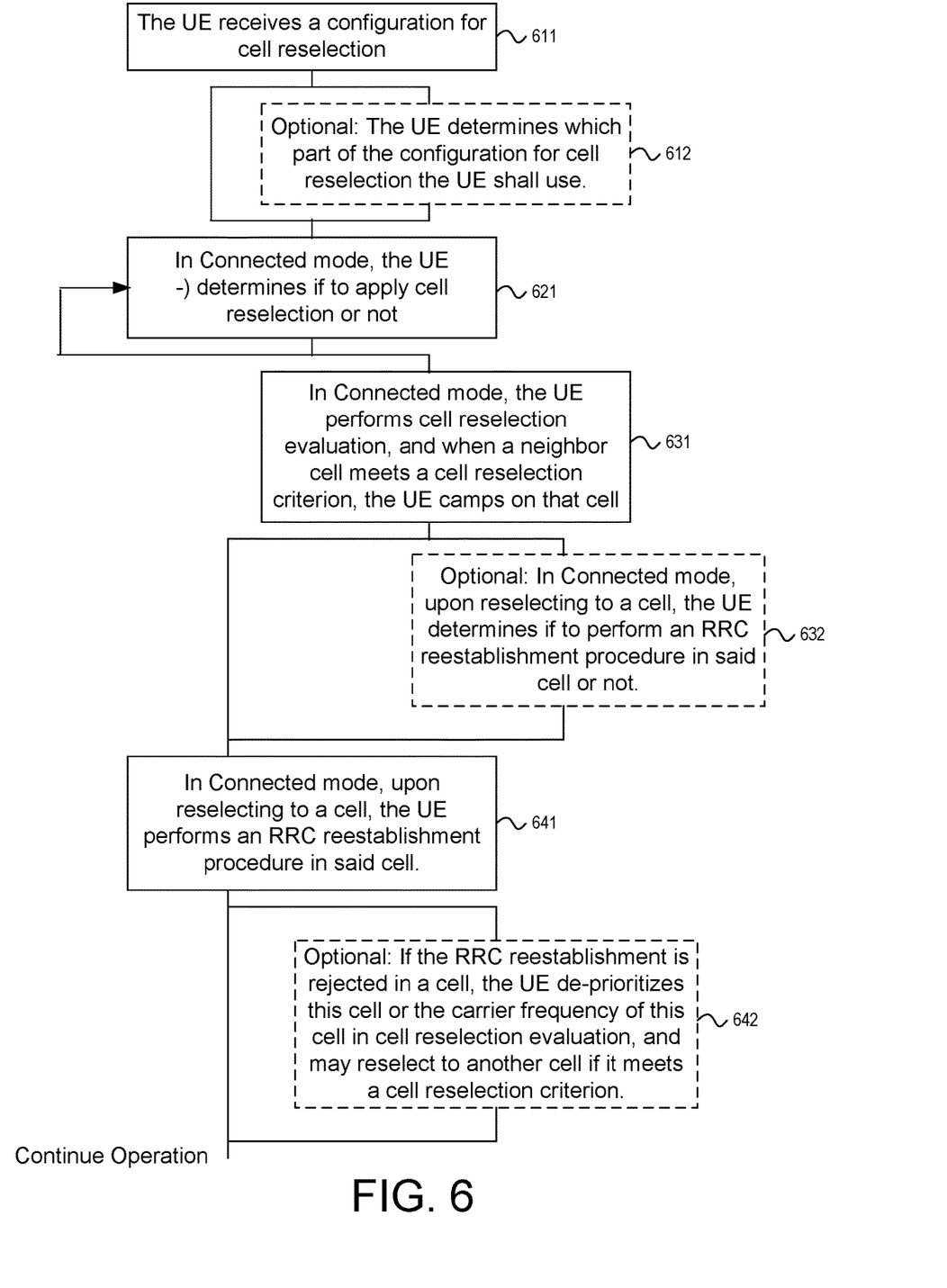
FIG. 6 illustrates steps for efficient UE cell reselection in accordance with one novel aspect.

FIG. 6 illustrates steps for efficient UE cell reselection in accordance with one novel aspect. In step 611, a UE receives a configuration for cell reselection. For connected mode cell reselection, the UE receives a specific configuration, that may need to be combined with selected parts of other configurations or of common configurations to be complete, either the Idle mode cell reselection configuration, or the connected mode measurement configuration, as depicted in step 612. Note that cell reselection is intended to be an operation controlled by the serving cell of the UE. In case the UE has long sleep time, there is a risk that the UE has moved a significant distance from its serving cell when the UE wakes up. In such case, parts of the cell reselection configuration provided in the serving cell may not make sense, e.g. the neighbor cell specific configurations such as cell specific offsets etc. Most probably the inter-frequency cell reselection configuration, e.g. priorities and thresholds for selecting to higher and lower priority layers have a validity scope that may span an area of multiple cells. Therefore, it is proposed that if a) the UE can no longer detect the cell where he received the cell reselection configuration from, and/or b) the UE sleep time>threshold, then the UE can ignore at least parts of the given cell reselection configuration, e.g. ignore configurations provided as a part of neighbor cell lists, or ignore a complete cell reselection configuration, and instead apply a predefined configuration, e.g. for the intra-frequency case.

In step 621, the UE determines whether to apply cell reselection in connected mode, i.e., if to suspend cell reselection or not. This step will be further elaborated below with respect to the coexistence between network controlled handover and cell reselection in connection with FIG. 7. As a power saving measure, measurement reporting could be dynamically suspended/used. In step 631, the UE performs cell reselection evaluation, and when a neighbor cell meets a cell reselection criterion, the UE camps on that cell. The steps of cell reselection could work as Idle mode cell reselection, or performed in a way that is similar to RRC connected measurement evaluation. A measurement event (e.g., LTE event A3/A4/A5) could be used to trigger intra-frequency or inter-frequency cell reselection. Note that different principles can be applied for intra-frequency and inter-frequency cases. One benefit of using measurement configurations according to connected mode is that UE could autonomously switch between cell reselection and measurement reporting, i.e. network controlled handover, while not causing ping-pong, as the cell borders and mobility triggering could be configured to be the same.

In step 641, upon reselecting to a new cell, the UE would perform signaling in this cell. This signaling is referred to as "reestablishment" since it preferably for LTE systems is based on LTE RRC connection reestablishment. It is suggested to have more functionality compared to current LTE procedure, to also reestablish user-plane, i.e. at least one data radio bearer and possibly also secondary signaling radio bearer. This could be achieved in a minimal signaling way by using configurations such as: 1) The configuration from the previous cell, e.g. fetched by network signaling; and 2) A predefined configuration, e.g. specified in specifications as default configurations, or pre-configured in the UE to be applied for a certain PLMN, or certain Tracking Areas, or other area identified by broadcasted identity. It need to be indicated from the UE to the network that the UE can and would like to initiate the enhanced RRC reestablishment, e.g. in the re-establishment request message. If the network support this, the usage of the enhanced reestablishment could be granted. The network shall respond to the UE in a response message at least one of the following: 1) Whether enhanced reestablishment is used, and 2) Which configuration the UE shall apply.

In an optional step 632 before step 641, the UE dynamically determines if to perform signaling in cell upon reselecting to it or not. Reducing the amount of mobility signaling, a UE may not need to perform the reestablishment signaling in every new cell, e.g. one scenario is that the UE may not need to perform this signaling in cells as long as the cells are controlled by the same eNB. In such scenario, the UE could be reached in multiple cells, monitoring DL control channels with a certain UE address, e.g. monitoring PDCCH or ePDCCH by a C-RNTI. A simple way to achieve this is that the eNB provides a list of cells to the UE, e.g. in the re-establishment signaling, meaning that the UE does not need to perform re-establishment upon cell change if the UE changes cell among these indicated cells and that the UE can use the specified DL address with the DL control channel in all of the indicated cells. Another way to indicate such cells is to indicate an area identity instead of a list of cells, and that the cells among which the UE doesn't need to do re-establishment upon reselection/selection, broadcast the indicated area identity. In yet another way, the UE after changing cell, only monitors the paging channel, with a RAN UE identity, e.g. C-RNTI, or C-RNTI combined with Cell ID.

Another complementary and useful criterion for when the UE shall initiate reestablishment could be that UE initiates reestablishment when there is user data to be sent, i.e. the UE postpones sending RRC reestablishment in a new cell until there is data to be sent. When data is sent, the reestablishment initiation could even be sent in the same transport block as the data. For an optimized implementation, the reestablishment information elements could be carried in MAC headers, e.g. a UE authentication code and UE identity such as C-RNTI, and possibly the identity of the cell where UE were last served, or the cell where the UE received the C-RNTI.

If the UE does not initiate reestablishment for a long time, and there is no data for transmission, it might be useful that the UE could do keep alive signaling, to keep the status of the UE synchronized between the UE and the base-station.

For such purpose it is proposed that reestablishment could be triggered by a timer. The timer could be started/restarted at the previous reestablishment, or at the previous successful transmission or reception of data.

Finally, in step 642, if the RRC reestablishment is rejected in a cell, the UE de-prioritizes this cell or the carrier frequency of this cell in cell reselection evaluation, and may reselect to another cell if it meets a cell reselection criterion.

Figure 7:
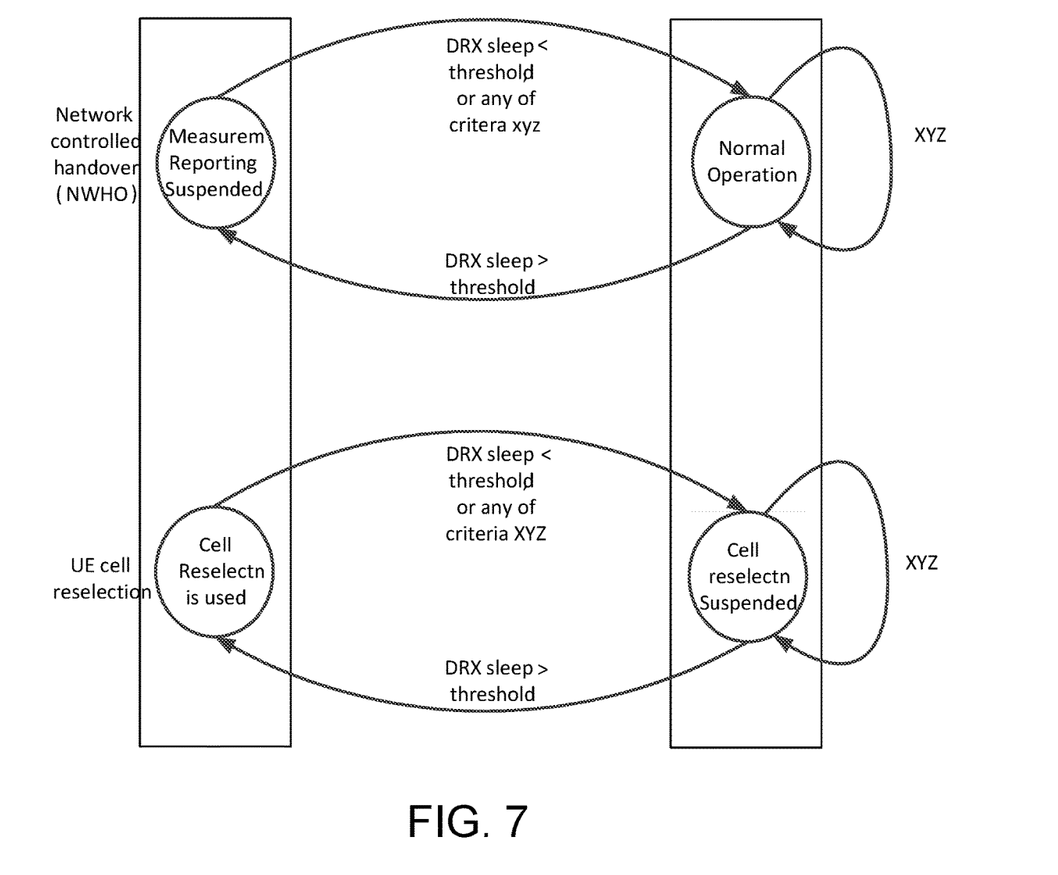
FIG. 7 illustrates the interaction between network controlled handover and UE controlled cell reselection.

FIG. 7 illustrates the interaction between network controlled handover and UE centric cell reselection. The network-controlled handover mechanism and the UE-centric cell reselection-based mechanism may be either mutually exclusive, or simultaneously operated. In the former case, the cell change mechanism is chosen by eNB using explicit configuration, e.g. cell reselection could be enabled and legacy handover procedure disabled, i.e. no measurement configuration for handover measurements in the UE. However, as it might involve significant overhead to toggle between two mobility mechanisms, a more efficient way is to allow simultaneous operations of network-controlled handover and UE-centric cell reselection mechanisms. First, the UE behavior upon receiving handover commands and configurations need to be considered. Second, the starting and stopping conditions for connected mode cell reselection need to be considered.

A UE performing connected mode cell reselection should still deliver measurements reports according to the network configuration, and obey network commands such as handover command (RRCConnectionReconfiguration with AbbilityControlInfo). Moreover, the connected mode cell reselection process may be started and stopped by explicit configuration from eNB, or suspended autonomously by UE on certain conditions, e.g. when entering a new cell or receiving handover command. FIG. 7 indicates how UE could behave autonomously to enable parallel operation. The most important aspect to make this work is to control the UE cell reselection, i.e. to suspend it and use it at the right moments in time, to prevent that it conflicts with network controlled handover. This is shown in the lower part of FIG. 7. Although not essential, it could be beneficial in terms of power consumption for the UE to suspend the support for network controlled handover when cell reselection is intended to be used. This is shown in the upper part of FIG. 7.

A possible criterion for autonomous activation/suspension of UE cell reselection and optionally activation/suspension of measurement reporting for network controlled handover is based on DRX. It is expected that DRX state is changed in reaction to traffic/data transmission, such that UE is kept more awake after data transmission, e.g. due to a running inactivity timer, or that short DRX state is entered, i.e. where a shorter DRX sleep cycle is applied. A UE that can autonomously switch between operating cell reselection and not, could apply the following rule: 1) Use cell reselection when DRX sleep>threshold, and then optionally also suspend measurement reporting for network controlled handover; 2) Suspend cell reselection when DRX sleep<threshold, and then relay on network controlled handover.

The criterion on DRX sleep>threshold could be implemented in many ways, it could mean e.g. DRX cycle>threshold, or just that UE is in long DRX or in extended DRX state. It could also include the condition that an inactivity timer is not running. Similarly, the criterion on DRX sleep<threshold could be implemented in many ways, it could mean e.g. DRX cycle<threshold, or just that UE is in short DRX or not in extended DRX state. It could also include the condition that an inactivity timer is running.

Non-related to the autonomous switching based on DRX, a number of conditions are needed for determining when to suspend cell reselection, in order to allow coexistence between cell reselection and network controlled handover. In FIG. 7 these conditions are referred to as XYZ. If optional suspension of measurement reporting is done, e.g. to save UE power, the conditions XYZ can also be used to suspend/use measurement reports (and network controlled handover).

Cell reselection could be suspended at one of the following conditions: 1) The UE entered the serving cell, where entered may mean connected to, selected to, reselected to, handed over to etc. 2) The UE recently entered the serving cell, since less that a predefined time, where entered may mean connected to, selected to, reselected to, handed over to etc. 3) The Time to trigger (TTT) timer is running for a configured measurement event. 4) A configured measurement event has been triggered. 5) A measurement report for a configured measurement event has been successfully sent, where the successfully sent determination may involve reception of a protocol acknowledgement. 6) The signal strength or signal quality of the serving cell is better than a specified or configured threshold.

Figure 8:
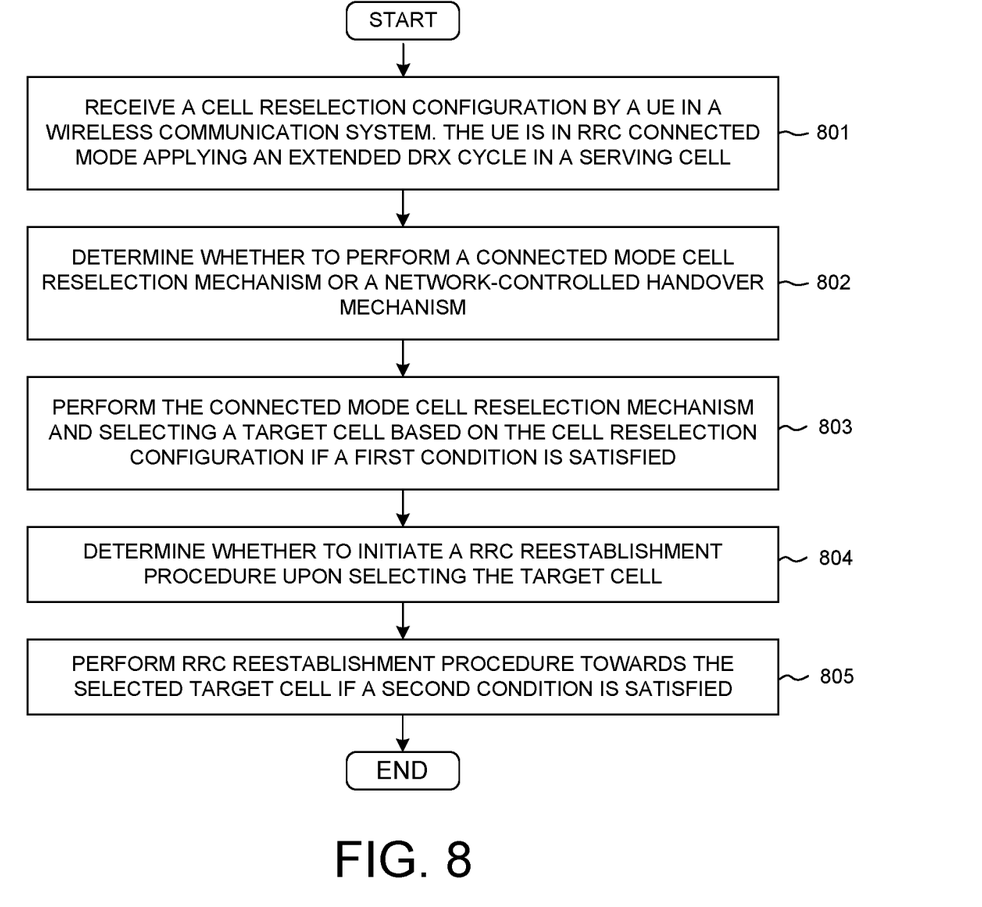
FIG. 8 is a flow chart of a method of connected mode cell reselection in a LTE network in accordance with one novel aspect.

FIG. 8 is a flow chart of a method of connected mode cell reselection in a LTE network in accordance with one novel aspect. In step 801, a user equipment (UE) receives a cell reselection configuration in a wireless communication system. The UE is in RRC connected mode applying an extended DRX cycle in a serving cell. In step 802, the UE determines whether to perform a connected mode cell reselection mechanism or a network-controlled handover mechanism. In step 803, the UE performs the connected mode cell reselection mechanism if a first condition is satisfied and selecting a target cell based on the cell reselection configuration. In step 804, the UE determines whether to initiate an RRC reestablishment procedure upon selecting the target cell. In step 805, the UE performs the RRC reestablishment procedure towards the selected target cell if a second condition is satisfied.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE) in a wireless communication system, comprising:
    receiving a cell reselection configuration by the user equipment (UE) when the UE is in Radio Resource Control (RRC) Connected mode applying an extended Discontinuous Reception (DRX) cycle in a serving cell;
    determining whether to perform a connected mode cell reselection mechanism or a network-controlled handover mechanism based on a first condition; and
    performing the connected mode cell reselection mechanism when the first condition is satisfied, the connected mode cell reselection mechanism includes:
        selecting a target cell based on the cell reselection configuration;
        after selecting the target cell, determining whether to initiate an RRC reestablishment procedure based on a second condition; and performing the RRC reestablishment procedure towards the selected target cell when the second condition is satisfied.

2. The method of claim 1, further comprising combining the cell reselection configuration with an Idle mode cell reselection configuration or a connected mode measurements configuration.

3. The method of claim 1, wherein determining whether to perform the connected mode cell reselection mechanism or the network-controlled handover mechanism is based on a DRX state of the UE.

4. The method of claim 1, wherein the first condition comprises at least one of receiving a specific measurement configuration from the network, the UE entering the serving cell, a signal strength or quality of the serving cell being above a threshold, a running timer to trigger (TTT) timer, a measurement event being triggered, and a measurement report being successfully sent.

5. The method of claim 1, wherein performing the connected mode cell reselection mechanism comprises performing an Idle mode cell reselection mechanism using connected mode parameters instead of Idle mode parameters.

6. The method of claim 1, wherein performing the connected mode cell reselection comprises, responsive to a measurement event, selecting the target cell without sending a measurement report.

7. The method of claim 1, wherein the second condition comprises at least one of receiving a specific configuration from the network, the target cell belonging to an area that the UE is not registered, the target cell belonging to an area that is different from an area where the UE is previously served, and an expiry of a timer.

8. The method of claim 1, wherein performing the RRC reestablishment procedure comprises establishing a data radio bearer (DRB) or establishing signaling radio bearers (SRBs).

9. The method of claim 1, further comprising:
receiving an RRC reestablishment reject message from a base station of the selected target cell.

10. The method of claim 9, further comprising de-prioritizing the target cell based on preconfigured de-prioritization information or specific de-prioritization information contained in the RRC reestablishment reject message.

11. A user equipment (UE), comprising:
a radio frequency (RF) receiver that is configured to receive a cell reselection configuration when the UE is in Radio Resource Control (RRC) Connected mode applying an extended Discontinuous Reception (DRX) cycle in a serving cell; and
a processing circuit configured to:
determine whether to perform a connected mode cell reselection mechanism or a network-controlled handover mechanism based on a first condition; and
perform the connected mode cell reselection mechanism when the first condition is satisfied, wherein the processing circuit is further configured to:
select a target cell based on the cell reselection configuration;
after selecting the target cell, determine whether to initiate an RRC reestablishment procedure based on a second condition; and
perform the RRC reestablishment procedure towards the selected target cell when the second condition is satisfied.

12. The UE of claim 11, wherein the processing circuit is further configured to combine the cell reselection configuration with an Idle mode cell reselection configuration or a connected mode measurements configuration.

13. The UE of claim 11, wherein the processing circuit is configured to determine whether to perform the connected mode cell reselection mechanism or the network-controlled handover mechanism based on a DRY state of the UE.

14. The UE of claim 11, wherein the first condition comprises at least one of receiving a specific measurement configuration from the network, the UE entering the serving cell, a signal strength or quality of the serving cell being above a threshold, a running timer to trigger (TTT) timer, a measurement event being triggered, and a measurement report being successfully sent.

15. The UE of claim 11, wherein the processing circuit when performing the connected mode cell reselection mechanism is further configured to perform an Idle mode cell reselection mechanism using connected mode parameters instead of Idle mode parameters.

16. The UE of claim 11, wherein the processing circuit when performing the connected mode cell reselection is further configured to, responsive to a measurement event, select the target cell without sending a measurement report.

17. The UE of claim 11, wherein the second condition comprises at least one of receiving a specific configuration from the network, the target cell belonging to an area that the UE is not registered, the target cell belonging to an area that is different from an area where the UE is previously served, and an expiry of a timer.

18. The UE of claim 11, wherein the processing circuit when performing the RRC reestablishment procedure is further configured to establish a data radio bearer (DRB) or establish signaling radio bearers (SRBs).

19. The UE of claim 11, wherein the RF receiver is further configured to receive an RRC reestablishment reject message from a base station of the selected target cell.

20. The UE of claim 19, wherein the processing circuit is further configured to de-prioritize the target cell based on preconfigured de-prioritization information or specific de-prioritization information contained in the RRC reestablishment reject message.

\* \* \* \* \*